(12) United States Patent
Lee (10) Patent No.: US 8,947,682 B2
(45) Date of Patent: Feb. 3, 2015

(54) IMAGE FORMING APPARATUS AND CONTROL METHOD THEREOF

(75) Inventor: Jae-yoon Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1213 days.

(21) Appl. No.: 12/026,713

(22) Filed: Feb. 6, 2008

(65) Prior Publication Data

US 2008/0316546 A1    Dec. 25, 2008

(30) Foreign Application Priority Data

Jun. 21, 2007  (KR) .................. 10-2007-0061083

(51) Int. Cl.
*H04N 1/04* (2006.01)
*H04N 1/00* (2006.01)

(52) U.S. Cl.
CPC ....... *H04N 1/00405* (2013.01); *H04N 1/00408* (2013.01); *H04N 1/0049* (2013.01); *H04N 2201/0081* (2013.01)
USPC ............ 358/1.13; 358/1.6; 358/443; 358/474

(58) Field of Classification Search
USPC .......... 358/1.13, 1.6, 474, 280, 443; 382/289, 382/299; 399/110, 371
See application file for complete search history.

(56) References Cited

U.S. PATENT DOCUMENTS

| | | | |
|---|---|---|---|
| 4,802,229 A * | 1/1989 | Yamada | 382/289 |
| 4,831,458 A * | 5/1989 | Watanabe | 358/443 |
| 5,536,926 A * | 7/1996 | Ikeda et al. | 235/462.25 |
| 5,909,226 A * | 6/1999 | Takeda | 347/3 |
| 6,295,071 B1 | 9/2001 | Mikuni et al. | |
| 6,381,377 B1 * | 4/2002 | Wang | 382/299 |
| 7,175,355 B2 * | 2/2007 | Narusawa | 400/76 |
| 7,377,606 B2 * | 5/2008 | Yoshida | 347/9 |
| 7,703,872 B2 * | 4/2010 | Nishikori et al. | 347/14 |
| 2004/0179219 A1 * | 9/2004 | Wong et al. | 358/1.13 |
| 2005/0111894 A1 * | 5/2005 | Hosoi | 399/371 |
| 2007/0076268 A1 * | 4/2007 | Shojo et al. | 358/474 |
| 2007/0253728 A1 * | 11/2007 | Yamazaki | 399/110 |

FOREIGN PATENT DOCUMENTS

| | | |
|---|---|---|
| JP | 55-162471 | 11/1980 |
| JP | 6-105089 | 4/1994 |
| JP | 07-230052 | 8/1995 |
| JP | 11-32150 | 2/1999 |

(Continued)

OTHER PUBLICATIONS

Chinese Office Action mailed in CN 200810007687.6 on Jun. 15, 2011.

(Continued)

*Primary Examiner* — Allen H Nguyen
(74) *Attorney, Agent, or Firm* — Staas & Halsey LLP (57) ABSTRACT

An image forming apparatus which includes a plurality of operating modes, the apparatus including a main body, a scanning unit to move along the main body and obtains an image data from an object to be scanned, an operation state display unit to display a position of the scanning unit, and a controller to set a display mode corresponding to an operating state that includes at least one operating mode of the plurality of operating modes and controls the operation state display unit to display the display mode set corresponding to the operating state.

19 Claims, 5 Drawing Sheets

(56) References Cited

FOREIGN PATENT DOCUMENTS

| | | |
|---|---|---|
| JP | 2001-223837 | 8/2001 |
| JP | 2005-37468 | 2/2005 |
| JP | 2007-134855 | 5/2007 |

OTHER PUBLICATIONS

Office Action issued in Japanese Patent Application No. 2008-083928 mailed on Aug. 30, 2011.

Chinese Office Action Issued on Mar. 28, 2012 in CN Patent Application No. 200810007687.6.

Japanese Notice of Final Rejection dated Aug. 7, 2012 issued in JP Application No. 2008-0083928.

Chinese Office Action dated Oct. 18, 2012 issued in CN Application No. 200810007687.6.

Korean Office Action dated Aug. 20, 2013 issued in KR Application No. 10-2007-0061083.

\* cited by examiner

IMAGE FORMING APPARATUS AND CONTROL METHOD THEREOF

CROSS-REFERENCE TO RELATED APPLICATIONS

This application claims priority from Korean Patent Application No. 10-2007-0061083, filed on Jun. 21, 2007, in the Korean Intellectual Property Office, the disclosure of which is incorporated herein by reference in its entirety.

BACKGROUND OF THE INVENTION

1. Field of the Invention

The present general inventive concept relates to an image forming apparatus and a control method thereof, and more particularly, to an image forming apparatus which is capable of displaying an operating state, and a control method thereof.

2. Description of the Related Art

An image forming apparatus which has a scanning function (hereinafter, also referred to as "scanning apparatus"), such as a scanner or a multifunction printer, reads out a predetermined image to be scanned from a document and generates an image data.

The image data is processed to be stored as a computer file or printed on a printing medium such as paper.

The image forming apparatus may have various operating modes according to resolution of the image data, properties such as color or monochrome, whether to store or print the image data, operating speed, etc.

Thus, the various operating modes of the image forming apparatus may be displayed so that a user may recognize them.

In particular, not only display modes established when the image forming apparatus is manufactured but also various display modes which can be set and changed by the user may be displayed.

SUMMARY OF THE INVENTION

The present general inventive concept provides an image forming apparatus which displays an operating state as various display modes so that a user may easily recognize various operating modes and a control method thereof Another aspect of the present general inventive concept is to provide an image forming apparatus where a user can set and change a display mode corresponding to an operating mode and a control method thereof.

Additional aspects and utilities of the present general inventive concept will be set forth in part in the description which follows and, in part, will be obvious from the description, or may be learned by practice of the general inventive concept.

The foregoing and/or other aspects of the present general inventive concept can be achieved by providing an image forming apparatus which includes a plurality of operating modes, the apparatus including a main body, a scanning unit to move along the main body and to obtain an image data from an object to be scanned, an operation state display unit to display an operating state of the scanning unit, and a controller to set a display mode corresponding to an operating state that includes at least one operating mode of the plurality of operating modes, and controls the operation state display unit to display the display mode set corresponding to the operating state.

According to an aspect of the general inventive concept, the image forming apparatus further includes a storage unit to store the display mode set corresponding to the operating state.

According to an aspect of the general inventive concept, the operation state display unit is disposed along a moving path of the scanning unit to display a scanning position of the object to be scanned.

According to an aspect of the general inventive concept, the operation state display unit includes at least one light emitting element and identifies the display mode according to at least one of a light emitting form, a light emitting color, a light emitting intensity and a flickering cycle of the light emitting element.

According to an aspect of the general inventive concept, the image forming apparatus further includes a user input unit to input a selection by a user with respect to the display mode corresponding to the operating state.

According to an aspect of the general inventive concept, the user input unit is provided as an operational panel disposed at one side of the main body.

According to an aspect of the general inventive concept, the image forming apparatus further includes a communication unit to communicate with a host apparatus through which a user is capable of selecting the display mode corresponding to the operating state, wherein the controller displays the display mode to correspond to the operating state received by the communication unit.

The foregoing and/or other aspects of the present general inventive concept can be achieved by providing a control method of an image forming apparatus which includes a main body, a scanning unit to move along the main body and to obtain image data from an object to be scanned and an operation state display unit that displays an operating state of the scanning unit, and includes a plurality of operating modes, the control method including setting a display mode corresponding to the operating state which includes at least one operating mode of the plurality of operating modes, and displaying the operating state in the display mode set corresponding to the operating state.

According to an aspect of the general inventive concept, the control method further includes storing the display mode set corresponding to the operating state, wherein the displaying displays an operating state in the display mode stored corresponding to the operating state.

According to an aspect of the general inventive concept, the control method further includes receiving selection by a user with respect to the display mode corresponding to the operating state, wherein the displaying is executed in the display mode selected by the user corresponding to the operating state.

The foregoing and/or other aspects of the present general inventive concept can also be achieved by providing a main body, a scanning unit to move along the main body and to obtain image data from an object to be scanned, and an operation state display unit to display at least one of a plurality of display modes corresponding to an operating state of the scanning unit.

According to an aspect of the general inventive concept, the operation state display unit further includes being disposed to display a scanning position of the object to be scanned.

According to an aspect of the general inventive concept, the operation state display unit further includes the operation state display unit including at least one light emitting element, and identifies the display mode according to at least one of a light emitting form, a light emitting color, a light emitting intensity, and a flickering cycle of the light emitting element.

The foregoing and/or other aspects of the present general inventive concept can also be achieved by providing an image forming apparatus further comprising a controller to control the display mode corresponding to the operating state through a user input unit of the image forming apparatus.

According to an aspect of the general inventive concept, the operation state display unit further includes a controller to receive the display mode with respect to the operating state from a host apparatus through a communication unit.

According to an aspect of the general inventive concept, the operation state display unit further includes a controller wherein the controller is transmitted the display mode with respect to the operating state from a host apparatus through a communication unit.

According to an aspect of the general inventive concept, the operation state display unit further includes a controller wherein the operation state display unit provides the display mode to include at least one of a light emitting form, a light emitting color, a light emitting intensity, and a flickering cycle of the light emitting element.

According to an aspect of the general inventive concept, the operation state display unit further includes a controller to control displaying of the display mode corresponding to the operating state that includes at least one operating mode of the plurality of operating modes of the image forming apparatus.

According to an aspect of the general inventive concept, the operation state display unit further includes a controller wherein the controller sets the operation state display unit to emit a light for a predetermined time when a plurality of modes of the operating state of the image forming apparatus are performed at the same time.

According to an aspect of the general inventive concept, the operation state display unit further includes a controller wherein the plurality of modes include at least a color mode, a high speed mode, and scan mode.

According to an aspect of the general inventive concept, the operation state display unit further includes a controller wherein the plurality of modes include at least a monochrome mode, a low speed mode, and copy mode.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
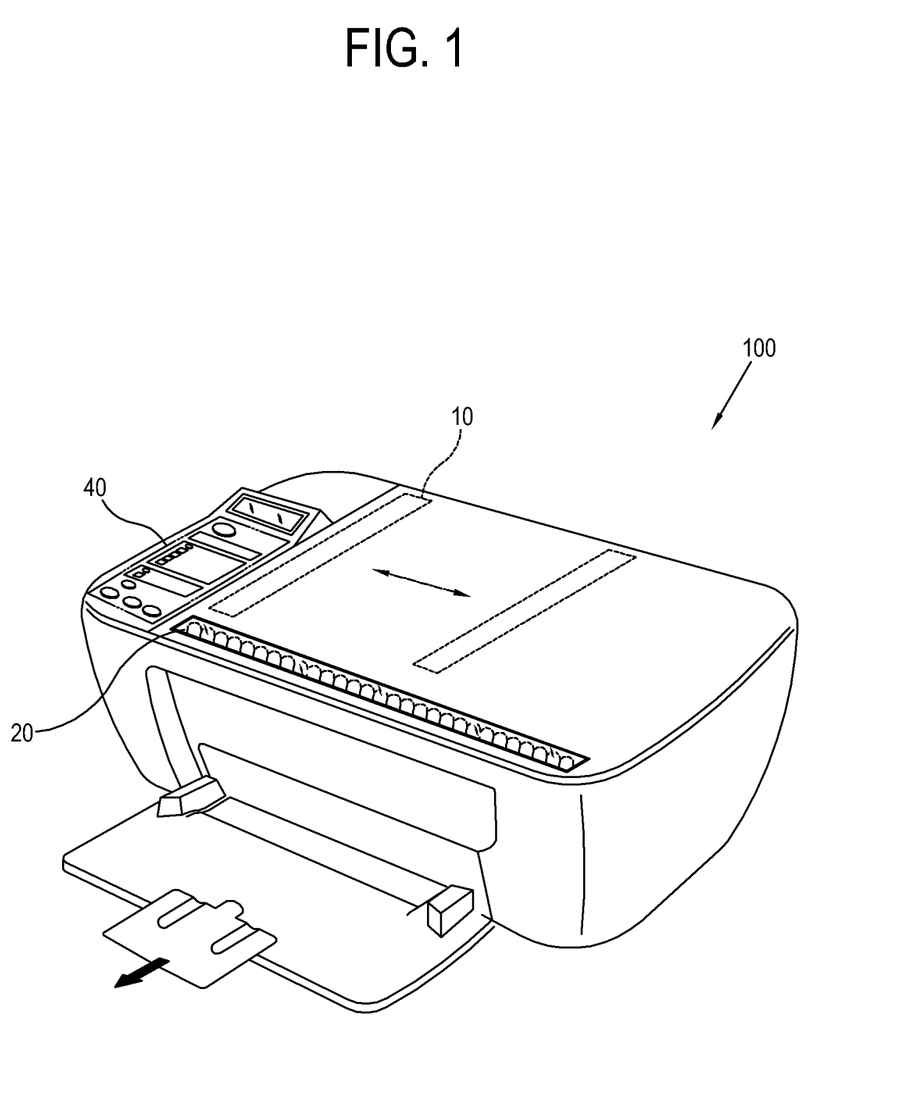
FIG. 1 is a perspective view to illustrate an outside appearance of an image forming apparatus according to an exemplary embodiment of the present general inventive concept.
Figure 2:
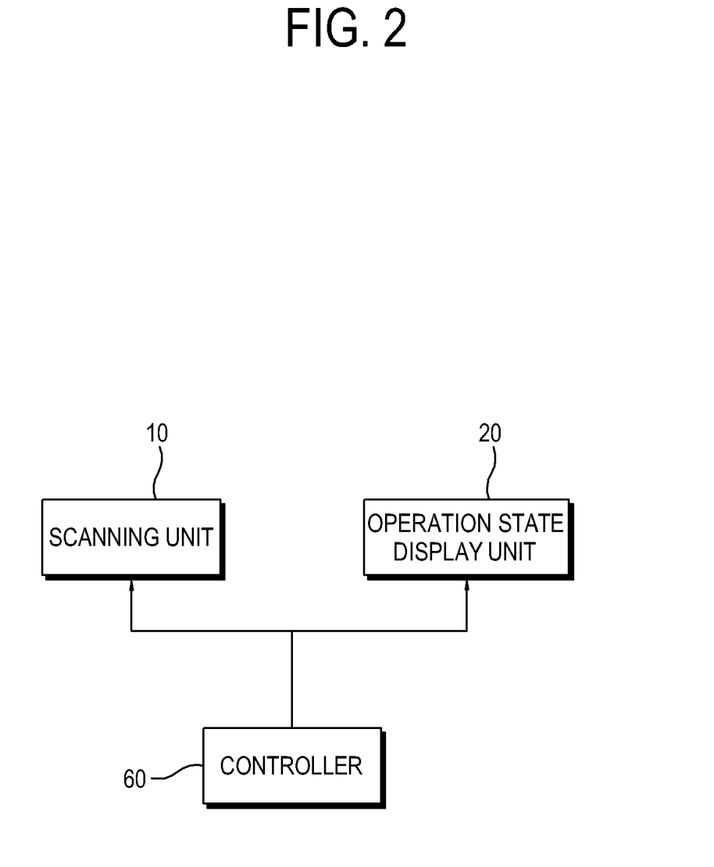
FIGS. 2 and 3 are block diagrams to illustrate a configuration of the image forming apparatus according to the exemplary embodiment of the present general inventive concept.
Figure 3:
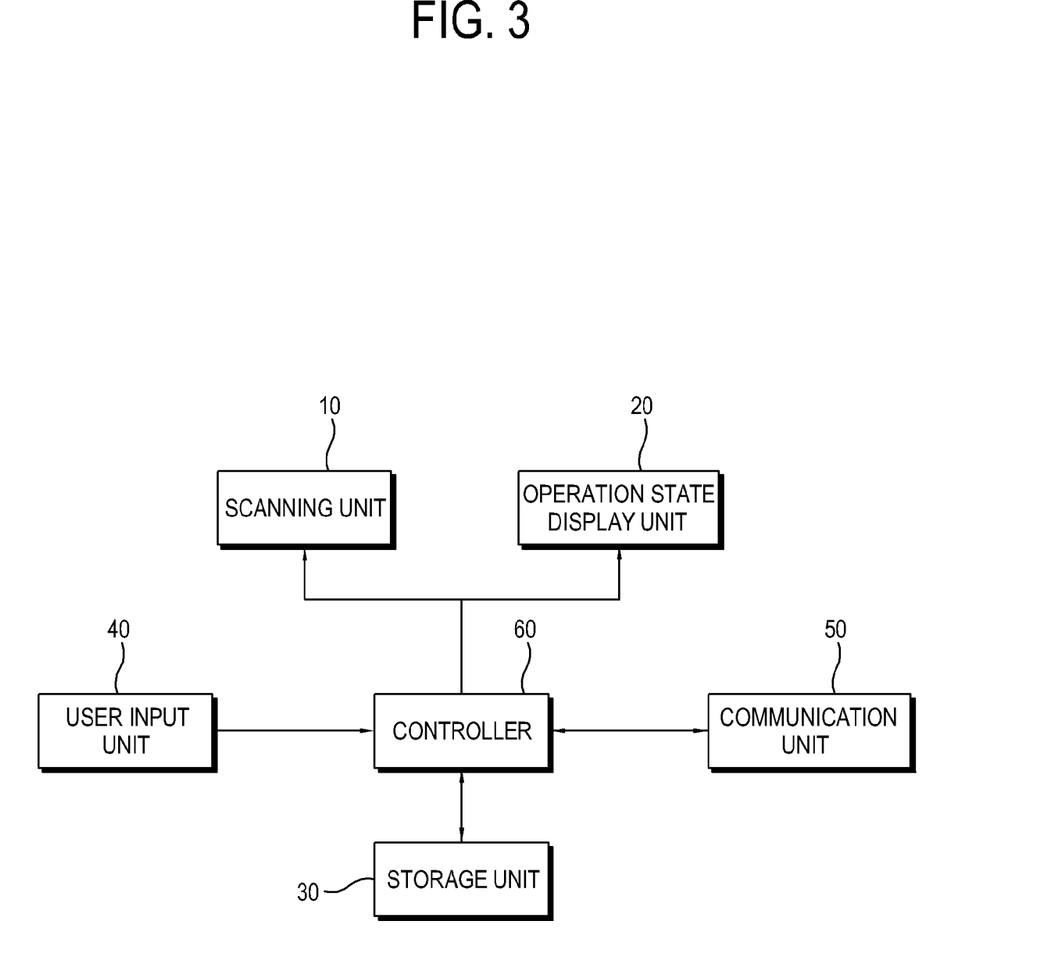

FIG. 1 is a perspective view to illustrate an external appearance of an image forming apparatus according to an exemplary embodiment of the present general inventive concept. FIGS. 2 and 3 are block diagrams to illustrate a configuration of the image forming apparatus according to the exemplary embodiment of the present general inventive concept.

An image forming apparatus performs a scanning or copying function by reading out a predetermined image to be scanned from a document, generating an image data, and storing or printing the image data. The image forming apparatus may be provided as a scanner, a multifunction printer, etc. The image forming apparatus may further perform the printing function by receiving a printing data from a host apparatus 200 such as a personal computer (PC) and forming an image on a printing medium on the basis of the data, and perform a fax function by transmitting/receiving a data via a communication equipment and outputting the received data.

Referring to FIGS. 1 to 3, the image forming apparatus according to this exemplary embodiment includes a main body 100, and a scanning unit 10, an operation state display unit 20, a storage unit 30, a user input unit 40, a communicating unit 50, a printing unit (not shown) and a controller 60 which are provided in the main body 100.

In FIG. 1, the scanning unit 10 is provided in an upper side of the main body 100 and scans a beam of light or a laser to a document to have an image input while moving along the main body 100. The scanning unit 10 includes an image sensor which is provided to process a predetermined image formed on a document to be scanned into data.

The scanning unit 10 may process details including an object to be scanned into image data of a form of joint photographic experts group (JPEG), bitmap, or the like by using a charge coupled device (CCD), an array contact image sensor (CIS), a non-array CIS, a photo sensor, or the like.

The image data which is generated may be stored as a file in the storage unit 30 or in a memory of a host apparatus 200 (see FIG. 4) via the communicating unit 50, or printed on a printing medium by the printing unit (not shown).

In addition, the printing unit may be provided as an inkjet printer by jetting ink onto a printing medium, a laser printer by selectively applying a developing agent onto a printing medium using a potential difference, or other types of printers. The printing unit may print data on a printing medium by the line or page.

The scanning unit 10 may have a plurality of modes according to resolution and properties of an image data, whether to store or print the image data, operating speed, or the like.

For example, various operating modes may include a high quality or low quality mode according to resolution of an image data to be formed, a color or monochrome mode according to the properties of the image data, a scan or copy mode according to whether to store/print the image data, a high speed or low speed mode according to an operating speed, etc.

In addition, the operating modes may further include scaling a copy, concentration of an output or an image data, the type of paper to be used, interruption operation, feeding type such as single-side scanning/printing and duplex scanning/printing, color adjustment in text mode, photograph mode, monochrome mode and color mode according to data processing method in scanning, which may be selected in a scanner, a multifunction printer or a copy machine.

The plurality of operating modes may be determined during manufacturing of the image forming apparatus, and stored in the storage unit 30. Resolution, operating speed, and the like, may have a plurality of levels.

Further, the image forming apparatus may have an operating state which corresponds to at least one operating mode of these operating modes.

In detail, the image forming apparatus performs one operating mode, or two or more operating modes at the same time. In other words, the image forming apparatus may have an operating state which corresponds to a combination of two or more operating modes.

In FIGS. 1 to 3, the operation state display unit 20 includes at least one light emitting element (not shown) and displays an operating state of the scanning unit 10.

In further detail, the operation state display unit 20 may be provided as a scan indicator which is disposed along a moving path of the scanning unit 10 and displays a scanning position of an object to be scanned.

For example, the operation state display unit 20 may include a plurality of light emitting diodes (LEDs) which are disposed along the moving path of the scanning unit 10 or a sensor which detects movement of the scanning unit 10 to emit light. In addition, the LEDs may be provided as multi-color LEDs.

The operation state display unit 20 may divide the display modes according to at least one of light emitting form, light emitting color, light emitting intensity and flickering cycle of the light emitting element. In other words, the display modes corresponding to the operating modes are displayed according to one of a light emitting form, a light emitting color, a light emitting intensity and a flickering cycle or a combination thereof, and thus a current operating state may be displayed to a user.

Thus, while the scanning unit 10 performs an operation, the operation state display unit 20 displays a display mode preset correspondingly to an operating state which includes at least one operating mode of the plurality of operating modes.

In FIG. 3, the storage unit 30 is provided as a storage medium, such as, for example, a memory, and stores a display mode corresponding to an operating state which includes at least one operating mode of the plurality of operating modes. The storage unit 30 may store a file which has been converted into an image data by the scanning unit 10. The storage unit 30 may be provided as not only an internal memory in the main body 100, but also an external memory which is connectable through the communication unit 50.

In FIGS. 1 and 3, a selection made by the user is input into the input unit 40 with respect to a display mode corresponding to an operating state. In further detail, the user selects a display mode corresponding to an operating state which includes at least one operating mode among the operating modes of the image forming apparatus via the user input unit 40. The user input unit 40 may be provided as an operational panel disposed at one side of the main body 100.

Figure 4:
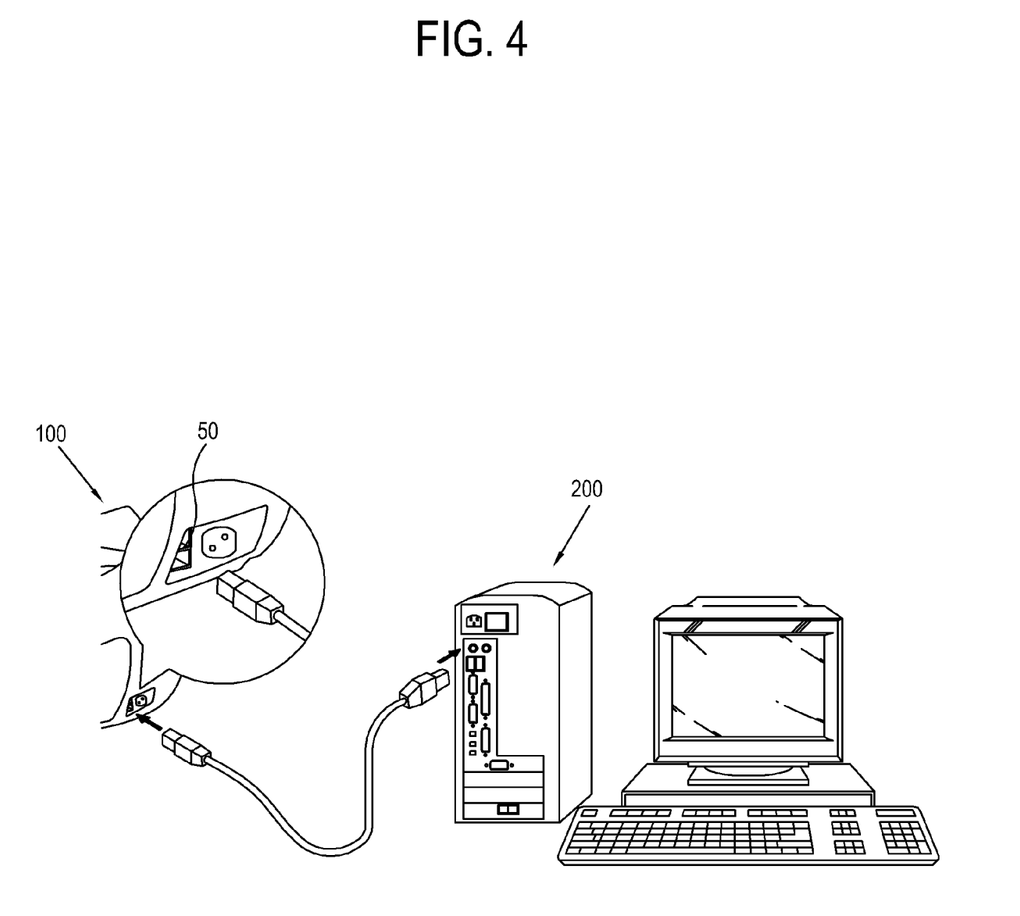
FIG. 4 illustrates that a display mode is set via a host apparatus according to the exemplary embodiment of the present general inventive concept.

In FIGS. 3 and 4, the communication unit 50 communicates with the host apparatus 200 through which the user is capable of selecting a display mode corresponding to an operating state. In addition, the communication unit 50 receives a selected display mode information from the host apparatus 200, a personal computer (PC) or the like. The communication unit 50 may be provided as a communication port which is connectable to the main body 100 or a wire/wireless communication module.

FIG. 4 illustrates that a display mode is set up through the host apparatus 200 according to an exemplary embodiment of the present general inventive concept.

Referring to FIG. 4, the communication unit 50 transmits and receives data between the main body 100 of the image forming apparatus and the host apparatus 200. The host apparatus 200 receives an input selection of the user with respect to a display mode corresponding to an operating state and transmits this input selection to the communication unit 50.

The controller 60 controls the operation state display unit 20 in order to display a display mode corresponding to an operating state, which includes at least one operating mode of the plurality of operating modes, if the image forming apparatus performs at least one operating mode of the plurality of operating modes.

Referring back to FIG. 3, the controller 60 controls the scanning unit 10 to perform at least one operating mode selected by the user among the plurality of operating modes. In addition, the controller 60 controls the operation state display unit 20 to display a display mode stored in the storage unit 30 corresponding to an operating state which includes at least one operating mode of the plurality of operating modes.

The controller 60 may include a multiplexer, a latch circuit, or the like, which is capable of controlling the light emitting element of the operation state display unit 20.

The controller 60 may receive an input display mode corresponding to an operating state through the user input unit 40. Further, a display mode selected with respect to an operating state which includes at least one operating mode of the plurality of operating modes from the host apparatus 200 through the communication unit 50 is transmitted to the controller 60, thereby displaying the display mode corresponding to the operating state which is being performed.

The controller 60 may not only set a display mode corresponding to an operating state but also modify the display mode. For example, the controller 60 sets the operation state display unit 20 to emit red light for five seconds for an operating state where color mode, high speed mode and scan mode are performed at the same time according to selection by the user. In addition, the controller 60 sets the operation state display unit 20 to flicker blue light every three seconds for an operating state where monochrome mode, low speed mode and copy mode are performed at the same time.

Moreover, the controller 60 sets various display modes for an operating state which further includes operating modes such as a paper feeding state, fax mode, etc., and controls the operation state display unit 20 to display the display modes. The display mode setting may be done differently depending on an operating state which includes various operating modes and changed according to selection by the user. Thus, the user may easily recognize the operating state through the display mode, and the operating state may be set and modified variously by the user.

Figure 5:
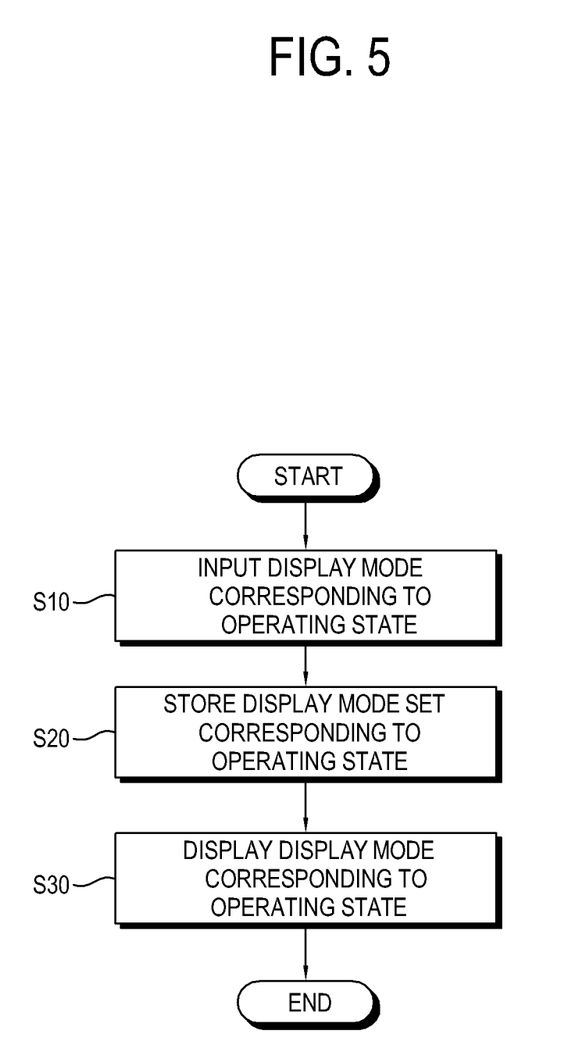
FIG. 5 is a flow chart to illustrate a control method of the image forming apparatus according to the exemplary embodiment of the present general inventive concept.

FIG. 5 illustrates a control method of the image forming apparatus which has the following configuration.

In FIG. 5, a selection is input to the controller 60 through the user input unit 40 to select a display mode corresponding to an operating state which includes at least one operating mode of a plurality of operating modes (operation S10). Here, the controller 60 may receive an operating state and information on a display mode corresponding to the operating state from the host apparatus 200 through the communication unit 50. Otherwise, the information on the display mode may be preset when the image forming apparatus is manufactured.

At this point, the storage unit 30 stores the display mode input at operation S10 which corresponds to the operating state which includes at least one operating mode of the operating modes (operation S20).

In FIG. 5, the controller 60 displays a display mode corresponding to an operating state which is being performed if the image forming apparatus performs at least one operating mode of the operating modes (operation S30). Here, a display mode corresponds to the display mode associated with the operating state selected at operation (operation S20). Then, the controller 60 may modify the set display mode according to selection by the user.

As described above, an image forming apparatus according to embodiments of the present general inventive concept displays an operating state in various display modes so that a user may easily recognize various operating modes.

In particular, a user may set and modify the display mode corresponding to various operating modes.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus which comprises a plurality of operating modes, the apparatus comprising:
   a main body;
   a scanning unit to move along the main body and to obtain image data from an object to be scanned;
   an operation state display unit disposed along a moving path of the scanning unit to display a current scanning position of the scanning unit along with one of a plurality of display modes indicating a plurality of operating modes of the image forming apparatus; and
   a controller to set one of the plurality of display modes corresponding to a current operating mode of the plurality of operating modes and to control the operation state display unit to display the set display mode,
   wherein the operation state display unit comprises a plurality of light emitting devices which are disposed along the moving path of the scanning unit to display the current scanning position of the scanning unit, and
   wherein the display modes are differently recognized by a user according to at least one of a light emitting form, a light emitting color, a light emitting intensity and a flickering cycle of the plurality of light emitting devices.

2. The image forming apparatus according to claim 1, further comprising:
   a storage unit to store the display mode set corresponding to the operating state.

3. The image forming apparatus according to claim 1, further comprising:
   an input unit to input a selection with respect to the display mode corresponding to the current operating mode of the plurality of operating modes.

4. The image forming apparatus according to claim 3, wherein the input unit is provided as an operation panel disposed at one side of the main body.

5. The image forming apparatus according to claim 1, further comprising a communication unit to communicate with a host apparatus through which the display mode corresponding to the current operating mode of the plurality of operating modes may be selected, wherein the controller displays the display mode to correspond to the current operating mode of the plurality of operating modes received by the communication unit.

6. The image forming apparatus according to claim 1, wherein the operation state display unit is disposed along at least a portion of the length of the moving path of the scanning unit.

7. A control method of an image forming apparatus which comprises a main body, a scanning unit to move along the main body and to obtain image data from an object to be scanned and an operation state display unit, and comprises a plurality of operating modes, the control method comprising:
   by the operation state display unit, displaying along a moving path of the scanning unit a current scanning position of the scanning unit;
   setting one of a plurality of display modes corresponding to a current operating mode of the plurality of operating modes; and
   by the operation state display unit, displaying the set display mode along with the current scanning position,
   wherein the operation state display unit comprises a plurality of light emitting devices which are disposed along the moving path of the scanning unit to display the current scanning position of the scanning unit, and
   wherein the displaying the set display mode differently recognized by a user comprises at least one of a light emitting form, a light emitting color, a light emitting intensity and a flickering cycle of the plurality of light emitting devices.

8. The control method according to claim 7, further comprising:
   storing the display mode set corresponding to the current operating mode, wherein the displaying the set display mode comprises displaying the display mode stored corresponding to the current operating mode.

9. The control method according to claim 7, further comprising:
   receiving a selection with respect to the display mode corresponding to the current operating mode, wherein the displaying is executed in the selected display mode.

10. An image forming apparatus, the apparatus comprising:
    a main body;
    a scanning unit to move along the main body and to obtain image data from an object to be scanned; and
    an operation state display unit disposed along a moving path of the scanning unit to display a current scanning position of the scanning unit along with one of a plurality of display modes indicating the operating modes of the image forming apparatus,
    wherein the operation state display unit comprises a plurality of light emitting devices which are disposed along the moving path of the scanning unit to display the current scanning position of the scanning unit, and
    wherein the display modes are differently recognized by a user according to at least one of a light emitting form, a light emitting color, a light emitting intensity and a flickering cycle of the plurality of light emitting devices.

11. The image forming apparatus of claim 10, further comprising:
    a controller to control the display mode corresponding to the operating state through an input to the image forming apparatus.

12. The image forming apparatus of claim 10, further comprising:
    a controller to receive the display mode with respect to the current operating mode of the plurality of operating modes from a host apparatus through a communication unit.

13. The image forming apparatus of claim 10, further comprising:
    a controller to control displaying of the display mode corresponding to the current operating mode of the plurality of operating modes of the image forming apparatus.

14. The image forming apparatus of claim 13, wherein the controller sets the operation state display unit to emit a light for a predetermined time when the plurality of operating modes of the image forming apparatus are performed at the same time.

15. The image forming apparatus of claim 14, wherein the plurality of modes includes at least two of a color mode, a high speed mode, and scan mode.

16. The image forming apparatus of claim 14, wherein the plurality of operating modes includes at least two of a monochrome mode, a low speed mode, and copy mode.

17. The image forming apparatus according to claim 10, wherein the operation state display unit is disposed along at least a portion of the length of the moving path of the scanning unit.

18. An image forming apparatus, the apparatus comprising:
   a main body;
   a scanning unit to obtain image data from an object to be scanned as the object is moved through the scanning unit; and
   an operation state display unit to display a current scanning position of the scanning unit along with one of a plurality of display modes indicating a plurality of operating modes of the image forming apparatus,
   wherein the operation state display unit is disposed along a moving path of the scanning unit to display the current scanning position of the scanning unit,
   wherein the operation state display unit comprises a plurality of light emitting devices which are disposed along the moving path of the scanning unit to display the current scanning position of the scanning unit, and
   wherein the display modes are differently recognized by a user according to at least one of a light emitting form, a light emitting color, a light emitting intensity and a flickering cycle of the plurality of light emitting devices.

19. A control method of an image forming apparatus which comprises a main body, a scanning unit to obtain image data from an object to be scanned and an operation state display unit, and comprises a plurality of operating modes, the control method comprising:
   by the operation state display unit, displaying along a moving path of the scanning unit a current scanning position of the scanning unit;
   setting one of a plurality of display modes corresponding to a current operating mode of the plurality of operating modes; and
   by the operation state display unit, displaying the set display mode along with the current scanning position,
   wherein the operation state display unit comprises a plurality of light emitting devices which are disposed along the moving path of the scanning unit to display the current scanning position of the scanning unit, and
   wherein the displaying the set display mode differently recognized by a user comprises at least one of a light emitting form, a light emitting color, a light emitting intensity and a flickering cycle of the plurality of light emitting devices.

* * * * *